(12) United States Patent
Zhang (10) Patent No.: US 7,746,853 B2
(45) Date of Patent: Jun. 29, 2010

(54) METHOD AND APPARATUS FOR TRANSPORTING BROADCAST VIDEO OVER A PACKET NETWORK INCLUDING PROVIDING CONDITIONAL ACCESS

(75) Inventor: Amy Zhang, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 1396 days.

(21) Appl. No.: 10/918,910

(22) Filed: Aug. 16, 2004

(65) Prior Publication Data

US 2006/0037041 A1    Feb. 16, 2006

(51) Int. Cl.
*H04L 12/56* (2006.01)

(52) U.S. Cl. .................. 370/389; 370/535; 725/32; 725/112

(58) Field of Classification Search .......... 370/473, 370/539, 389; 342/359, 352; 725/31, 87, 725/102, 142
See application file for complete search history.

(56) References Cited

U.S. PATENT DOCUMENTS

| | | | |
|---|---|---|---|
| 5,920,572 A * | 7/1999 | Washington et al. | 370/535 |
| 5,946,326 A * | 8/1999 | Rinne | 725/54 |
| 6,441,782 B2 * | 8/2002 | Kelly et al. | 342/359 |
| 7,382,881 B2 * | 6/2008 | Uusitalo et al. | 380/262 |
| 2002/0116705 A1 * | 8/2002 | Perlman et al. | 725/31 |
| 2002/0163911 A1 * | 11/2002 | Wee et al. | 370/389 |
| 2004/0047470 A1 * | 3/2004 | Candelore | 380/240 |
| 2004/0187161 A1 * | 9/2004 | Cao | 725/110 |
| 2006/0018470 A1 * | 1/2006 | Paila et al. | 380/223 |

OTHER PUBLICATIONS

K. Deen and R. Wade, "Implementation of DVB Simulcrypt ETSI TS103197V1.3.1 Architecture," Tandberg Television, United Kingdom, IBC Conference Paper 2002.
"Head-End Implementation of DVB Simulcrypt," Digital Video Broadcasting Document A045, Draft Rev 1.1g, Nov. 12, 1998.

* cited by examiner

*Primary Examiner*—Ricky Ngo
*Assistant Examiner*—David Oveissi
(74) *Attorney, Agent, or Firm*—Dov Rosenfeld; Inventek (57) ABSTRACT

A method, an apparatus and a carrier medium for securely distributing multimedia while still retaining compatibility with existing CA systems. The method includes forming a packet including a plurality of encrypted multimedia stream segments. The packet further includes, for each segment of the plurality, a field providing conditional access information associated with the segment. The method further includes sending the packet to an intermediary. The method is such that the intermediary receiving the packet can send a first segment of the plurality and any associated conditional access information to a first receiver, and send a second segment of the plurality and any associated conditional access information to a second receiver. The method is also such that no decryption of any segment of the plurality is required by the intermediary to send the first segment or to send the second segment.

22 Claims, 5 Drawing Sheets

METHOD AND APPARATUS FOR TRANSPORTING BROADCAST VIDEO OVER A PACKET NETWORK INCLUDING PROVIDING CONDITIONAL ACCESS

BACKGROUND

This invention is related to multimedia transport networks such as video distribution networks, and to conditional access systems for accessing multimedia content transported via such a network.

There is currently in use a wide-array of technologies, protocols and standards for distributing multimedia services, e.g., video and audio programs. Existing multimedia transport networks provide the basic infrastructure for transporting such services from content providers to consumers. For example, one multimedia transport network model connects content providers, intermediaries and consumer set-top boxes together to enable effective distribution of multimedia services in real-time. The end result gives end-users, e.g., consumers, the ability to watch, play or otherwise interact with a selection of programs and services, e.g., video and audio programs, from a wide-array of sources.

Many transport networks are broadcast-oriented in that content providers or intermediaries send roughly the same signal representing one or more multimedia services to a plurality of end-users (consumers). Conditional access (CA) systems have been developed to control the usage and distribution of such services. A CA system provides one or more service providers and/or one or more intermediaries the ability to control who has access to such multimedia services. This is done for a numbers of reasons including to ensure that consumers pay for such service and/or to selectively allow or restrict consumer access to specific programs.

CA systems are often incompatible with each other, e.g., they include proprietary or secret components, and thus make interoperability difficult for content providers, intermediaries and consumers alike. There have been some efforts by industry groups to provide interoperability between CA systems. The Digital Video Broadcasting (DVB) Group (The DVB Project, Geneva, Switzerland) has developed a CA system standard called DVB Simulcrypt that provides for different CA routers, multiplexers and set-top boxes, potentially from different vendors, to be integrated seamlessly.

Figure 1:
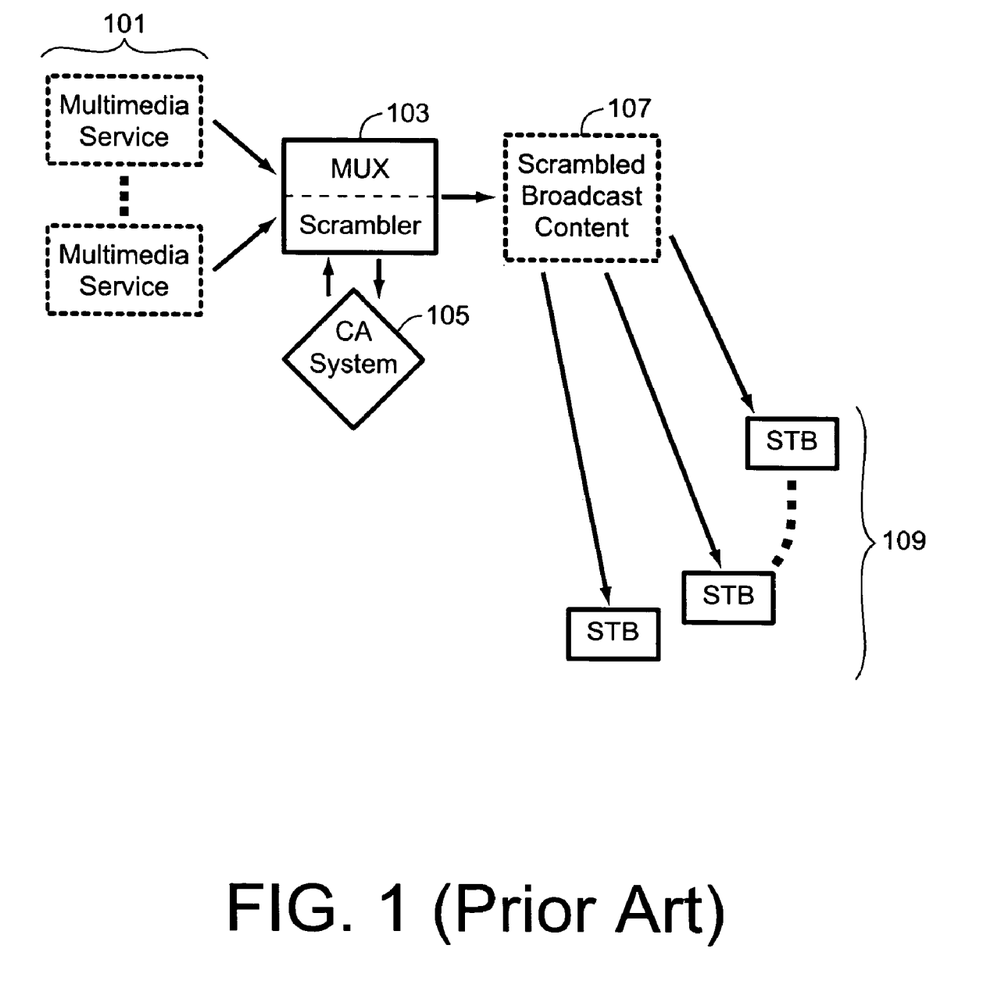
FIG. 1 shows a simplified diagram of a broadcast-oriented multimedia transport network with a CA system.

FIG. 1 illustrates a simplified example of a multimedia transport network that includes a CA system. One or more multimedia services 101, e.g., video programs, are transported to system 103 containing a multiplexer ("MUX") and a scrambler. The multiplexer combines a plurality of multimedia services, e.g., video programs, into a single stream for distribution that can be later demultiplexed, e.g., uncombined, by devices such as the set-top boxes 109. The scrambler in system 103 scrambles or encrypts information such as the multimedia services 101. The MUX/Scrambler system 103 receives messages from a CA system 105 that provides the scrambler with one or more codewords used to scramble or encrypt the multimedia services as required to produce encrypted, multiplexed content 107. The encrypted, multiplexed content 107 is broadcast, typically in real-time, to one or more consumer set-top boxes (STB) 109. Each set-top box then demultiplexes and decrypts the broadcast data according to the rights provided to the particular set-top box, allowing the consumer to play, watch or interact with the multimedia service, as appropriate. Because there is no return-path from the set-top boxes in a broadcast-oriented transport network, a smartcard or similar device typically is used as a security device to descramble, i.e., decrypt, the content.

There are many forms of CA information known in the art. In the case of DVB Simulcrypt CA systems, messages called Entitlement Control Messages (ECMs) are used to carry encrypted traffic keys, e.g., codewords used to decrypt or decrypt multimedia content, to the set-top boxes. In addition to ECMs, messages called Entitlement Management Messages (EMMs) are used in Simulcrypt by a set-top box to determine if the consumer has the appropriate rights to access a particular multimedia service. ECMs and EMMs are items of CA information that, in the case of digital broadcast transport networks, are typically transported along with broadcast encrypted content.

Broadcast transport networks may be digital or analog. In the last few years, the broadcast transport networks used to link intermediaries with consumer set-top boxes have increasingly been digital, enabling all parties to benefit from the efficiency and capability of digital networks. Such transport networks include digital broadcast satellite (DBS) networks, digital cable hybrid/fiber coax (HFC) networks and terrestrial digital networks.

Digitized multimedia services, such as digital video programs or digital interactive content, are often compressed to decrease the cost associated with distribution. The Motion Picture Experts Group Standard 2 (MPEG-2) compression standard, for example, has become very popular and is currently (as of August, 2004) the de facto standard for compressing video programs in the digital video broadcast industry. The MPEG-2 standard provides a method in an encoder to deconstruct a multimedia service, e.g., a video program containing both video and audio or a multi-channel audio-only program, into elementary streams, e.g., one or more video or audio elementary streams. The resulting one or more elementary streams, along with other information such as timing information, e.g., to lip-sync audio and video elementary streams, are used by playback devices to reassemble an approximate reconstruction of the original multimedia service, e.g., the original video program or multi-channel audio-only program. MPEG-2 video is described in ISO/IEC 13818-2, while MPEG-2 audio is described in ISO/IEC 13818-3.

The MPEG-2 standard in ISO/IEC 13818-1 describes MPEG-2 transport packets. MP2T designates the use of MPEG-2 transport streams, for either audio or video, in packetized form. Packetized multimedia streams usually include additional information other than raw video and/or audio data. Such additional information can include identifying information, e.g., to identify the type of content in the packet, synchronization information, e.g., to identify and order received packets, transport information, e.g., to assist routing of packets, etc. For example, MP2T streams are a multiplex of packetized MPEG-2 elementary streams. Individual MP2T packets of a particular MP2T stream include, in addition to an MP2T payload containing a segment of raw multimedia data, e.g., a segment of an elementary stream, an MP2T header containing additional information such as identifying information and synchronization information.

Recently, Internet Protocol (IP) packet networks, such as the Internet, have become increasingly popular. Some vendors, looking to reduce costs and explore alternative multimedia distribution schemes, have attempted to use IP-based networks to carry digital multimedia streams. The Real-Time Transport Protocol (RTP), as defined in RFC-2250 (IETF), provides for real-time synchronization, and for transporting audio-video over IP-networks. For example, RTP provides for encapsulating one or more MP2T stream packets into an IP packet for transport over an IP network. Unfortunately, using IP to broadcast or otherwise transport multimedia services from content providers directly to consumer set-top boxes is not yet practical. More explicitly, a widely-deployed, low-cost IP-based infrastructure with sufficient real-time bandwidth to support transporting the kind of high quality, real-time multimedia streams as broadcast by multimedia service providers does not yet exist. Nonetheless, IP-based networks can potentially provide a low cost, flexible way for content providers to distribute multimedia services around the world.

Rather than broadcast multimedia streams from content providers all the way to end-user consumers, one existing compromise uses existing packet networks, e.g., existing IP networks, to transport multimedia streams from the content providers to one or more intermediaries. Transporting from an intermediary to the consumer set-top boxes then uses an existing digital broadcast transport network, such as a DBS network or a digital HFC network.

One of the problems with transporting content using IP from content providers to intermediaries and/or consumers is providing conditional access. While there exists a large number of methods for encrypting data over IP, a method of encrypting multimedia streams and transporting them over IP while retaining compatibility with existing CA systems is not known.

Two examples of existing methods of securely transporting material over IP networks are IPSec and Secure RTP (SRTP). IPSec, defined by a number of IETF RFCs, lacks two critical requirements for use in digital broadcast transport networks. While IPSec supports point to multipoint data encryption, this form of encryption is not readily compatible with existing CA infrastructure. Second, IPSec does not readily support the selective encryption of the data payload. For example, in order for some MP2T receivers to properly handle encrypted MP2T streams using RTP, the RTP headers of an RTP packet and the MP2T headers of any MP2T packets contained in such an RTP packet must not be encrypted, e.g., be what is termed "in the clear."

Secure RTP (SRTP), defined by RFC-3711 (IETF), is potentially more useful, and combines the real-time synchronization aspects of the RTP protocol with encryption. SRTP further provides multicasting support. In particular, SRTP provides end-to-end and multicast IP encryption for multimedia services. Like RTP, SRTP supports multiple program transport, e.g., transporting a multiplexed multimedia stream, over IP. For example, a single SRTP packet can contain one or more MP2T packets, each MP2T packet belonging to possibly different MP2T streams, e.g., different multimedia services or programs. In addition, SRTP supports different multimedia formats including H.26x, MPEG-1, MPEG-2 and MPEG-4.

While SRTP supports having multiple multimedia stream segments, e.g., several MP2T packets per SRTP packet, the encryption for a particular SRTP packet is applied to the entire SRTP payload, e.g., to the part of the packet containing all the MP2T packets of the particular SRTP packet. This is incompatible with the needs of content providers and intermediaries, which require the ability to flexibly select and route different encrypted multimedia stream segments of a particular SRTP packet during transport. Thus, because of SRTP's inability to separately encrypt individual multimedia stream segments, applying STRP to existing CA systems is difficult, if not impossible.

Thus, there is a need in the art for a method and apparatus that can transport multimedia services over IP networks and over traditional digital broadcast transport networks while still retaining compatibility with existing CA systems, including the ability to encrypt individual multimedia stream segments of a packet used for transporting multimedia services.

SUMMARY

The present invention is related to multimedia transport networks such as video distribution networks, and to conditional access systems for accessing multimedia content transported via such a network.

Disclosed herein are a method, an apparatus and a carrier medium for securely distributing multimedia while still retaining compatibility with existing CA systems. The method includes forming a packet that includes a plurality of encrypted multimedia stream segments. The packet further includes, for each segment of the plurality, a field providing conditional access information associated with the segment. In one embodiment, the method further includes sending the packet to an intermediary, such that the intermediary receiving the packet can send a first segment of the plurality and any associated conditional access information to a first receiver, and send a second segment of the plurality and any associated conditional access information to a second receiver. The method is also such that no decryption of any segment of the plurality is required by the intermediary in order for the intermediary to send the first segment or to send the second segment.

Also disclosed herein is a method, an apparatus and a carrier medium for securely distributing multimedia while still retaining compatibility with existing CA systems. The method includes receiving a packet including a plurality of encrypted multimedia stream segments. The packet further includes, for each segment of the plurality, a field providing conditional access information associated with the segment. The method further includes sending a first segment of the plurality and any associated conditional access information to a first receiver, and sending a second segment of the plurality and any associated conditional access information to a second receiver. The method is such that no decryption of any segment of the plurality is required to send the first segment or to send the second segment.

DETAILED DESCRIPTION

Aspects of the present invention provide for multicasting multiple program streams securely over IP networks while retaining compatibility with existing CA systems.

Method at the Sender

One aspect of the present invention occurs at a sender of information and includes forming a packet that contains one or more of encrypted multimedia segments, e.g., parts, of multimedia streams and that further contains associated conditional access information in such a way that an intermediary can send arbitrary encrypted multimedia segments to different end destinations without the intermediary needing to decrypt and/or re-encrypt the contents of the encrypted multimedia segments.

Figure 3A:
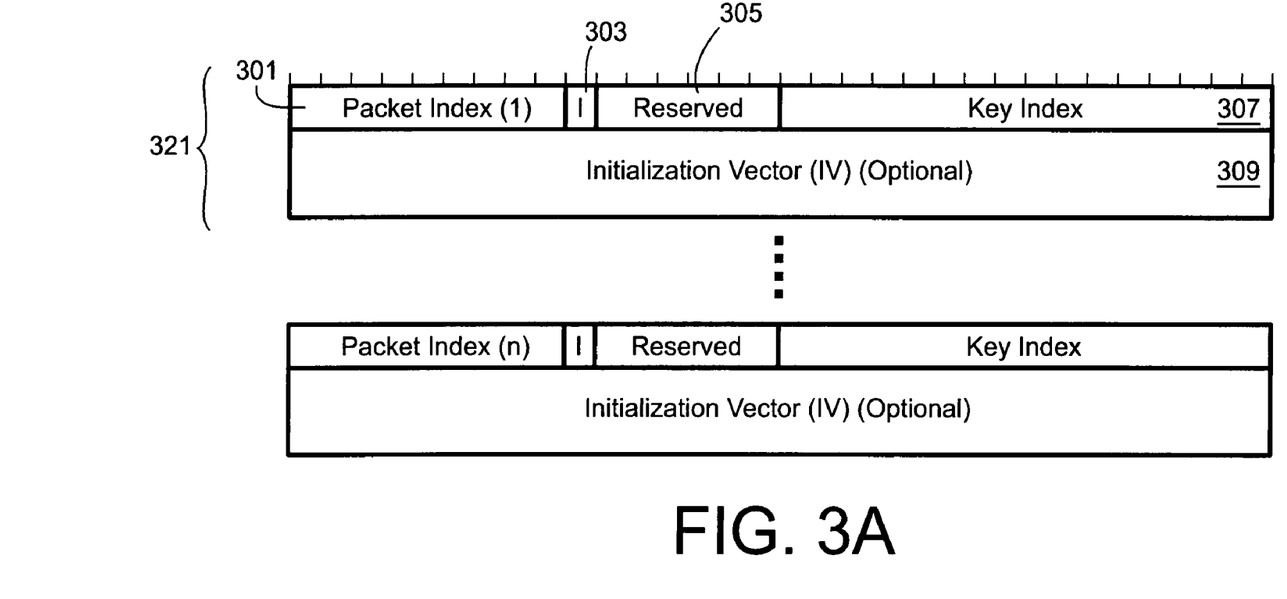
FIG. 3A shows a packet-level description of an extension field used in one embodiment of the present invention.

Thus, one embodiment is a method implemented at the sender of information e.g., a program provider such as a cable company or a satellite company. The method forms a packet for transmission over a packet network, e.g., an IP network. In one embodiment, the packet includes one or more segments of one or more multimedia streams, e.g., video programs. In the embodiment described herein, at least one multimedia stream is part of a video program substantially conforming to MPEG-2. In one embodiment, there are at least two multimedia stream segments. Any of these segments may be encrypted, and each segment may be encrypted by a method different than the method used to encrypt another segment. In one embodiment, a stream block cipher is used to encrypt those segments for which encryption is desired. In one embodiment, the stream block cipher method is the US Data Encryption Standard (DES) method, in particular the Cipher Block Chaining (CBC) mode DES method, referred to as DES-CBC herein. See for example (IETF) RFC-1829 entitled, "The ESP DES-CBC Transform." The invention, however, is not restricted to any particular type of encryption, and alternate embodiments can use alternate block stream cipher methods to encrypt the segments. One such alternate embodiment uses the Advanced Encryption Standard (AES) published by the National Institute of Standards and Technology (NIST) as U.S. FIPS PUB 197 (FIPS 197) on Nov. 26, 2001. For each multimedia stream segment of the packet, a provision is provided in the packet to include conditional access information associated with the segment. In one version, the conditional access information is in the form of an initialization vector, and in another, the conditional access information is simply an index. See the description below of FIG. 3, in particular, field 301 FIG. 3. In one embodiment, the conditional access information substantially conforms to the DVB Simulcrypt standard. In one embodiment, the packet appears as an SRTP packet to an SRTP compatible device. In other embodiments, the packet substantially conforms to an SRTP-like packet structure described in more detail hereinbelow.

One embodiment of the method further includes sending the packet to an intermediary. As an example, in one embodiment, this includes sending the packet over an IP network to a host associated with the intermediary. In one embodiment, the sending to an intermediary includes multicasting the packet over a packet network to a group of hosts, the group including a host associated with the intermediary. The intermediary, in one example, is a terrestrial headend, and part of digital video broadcast network. In another embodiment, the intermediary is an MPEG-2 MP2T router.

The method is implemented such that an intermediary receiving the packet can send a first segment in the packet to a first receiver, e.g., a first end user, and another segment in the packet to another receiver, e.g., a second end user, without the intermediary having to perform decryption on any of the segments. This provides a method, for example, to a content provider to provide two video programs, each as video streams that are encrypted, each with different conditional access rights. A packet containing one encrypted segment from each program can be received at an intermediary, e.g., a terrestrial headend, and then each segment, hence each video program, can then be sent to two different regional viewing markets. There is no need for decrypting and re-encrypting the contents of the packet by the intermediary.

Method at the Intermediary

Another aspect of the invention is what happens at an intermediary, e.g., a headend. One embodiment is a method for receiving a packet that includes multimedia information via a packet network, e.g., via an IP network. The receiving, for example, is at an intermediary such as a headend coupled to a packet network. The packet includes at least one segment of one or more multimedia streams, although, as described below, a protocol is followed that also allows for no segments to be included in any particular packet. In one embodiment, at least one multimedia stream is part of a multimedia program that substantially conforms to MPEG-2. In one embodiment, there are at least two multimedia stream segments. One aspect of the invention provides for these segments to be encrypted. Any of these segments may be encrypted, and each segment may be encrypted by a method different than the method used to encrypt another segment. In one embodiment, when encryption is applied to one or more of the segments, a stream block cipher such as 3DES-CBC is used to encrypt the segments. Another aspect of the invention provides for the packet to include conditional access information associated each included multimedia stream segment. In one embodiment, the conditional access information substantially conforms to the DVB Simulcrypt standard. In one embodiment, the received packet is such that an SRTP compatible device can accept the packet as an SRTP packet. In other embodiments, the packet substantially conforms to an SRTP-like packet structure described in more detail hereinbelow.

One embodiment of the method at the intermediary further includes the intermediary receiving a packet containing a plurality of multimedia stream segments, and sending a first segment of the plurality and any associated conditional access information to a first receiver. The method further includes sending a second segment of the plurality and any associated conditional access information to a second receiver. In one embodiment, the sending is over a digital broadcast transport network. In one embodiment, the first receiver and the second receiver are set-top boxes. In one embodiment, the method is implemented in a headend of a digital broadcast transport network.

The method is implemented such that the sending can be performed without having to perform decryption on any of the segments. For example, a content provider can provide two video programs as video streams to be encrypted, each having different conditional access rights. A packet containing one encrypted segment from each program can be received at an intermediary, e.g., a terrestrial headend, and then each segment, hence each video program, can be sent to two different regional viewing markets. There is no need for decrypting and re-encrypting the contents of the packet by the intermediary.

SRTP-Like Packet Structure

An aspect of the invention is the use of an SRTP-like packet structure for transporting multimedia streams. For the sake of brevity, this description describes only differences between the SRTP-like packet structure and a packet that conforms exactly to the SRTP specification. The reader, therefore, is assumed to be familiar with the standard RTP structure and standard SRTP structure. See, for example, (IETF) RFC-3550 entitled "RTP: A Transport Protocol for Real-Time Applications" by Schulzrinne et al. and (IETF) RFC-3711 entitled "The Secure Real-time Transport Protocol (SRTP)" by Baugher et al., for details on the RTP and SRTP packet structure respectfully.

SRTP's security goals are to ensure the confidentiality of RTP payloads—and for real time TCP payloads, RTCP payloads, and to ensure the integrity of the entire RTP (and RTCP) packets, together with protection against replayed packets.

Figure 2:
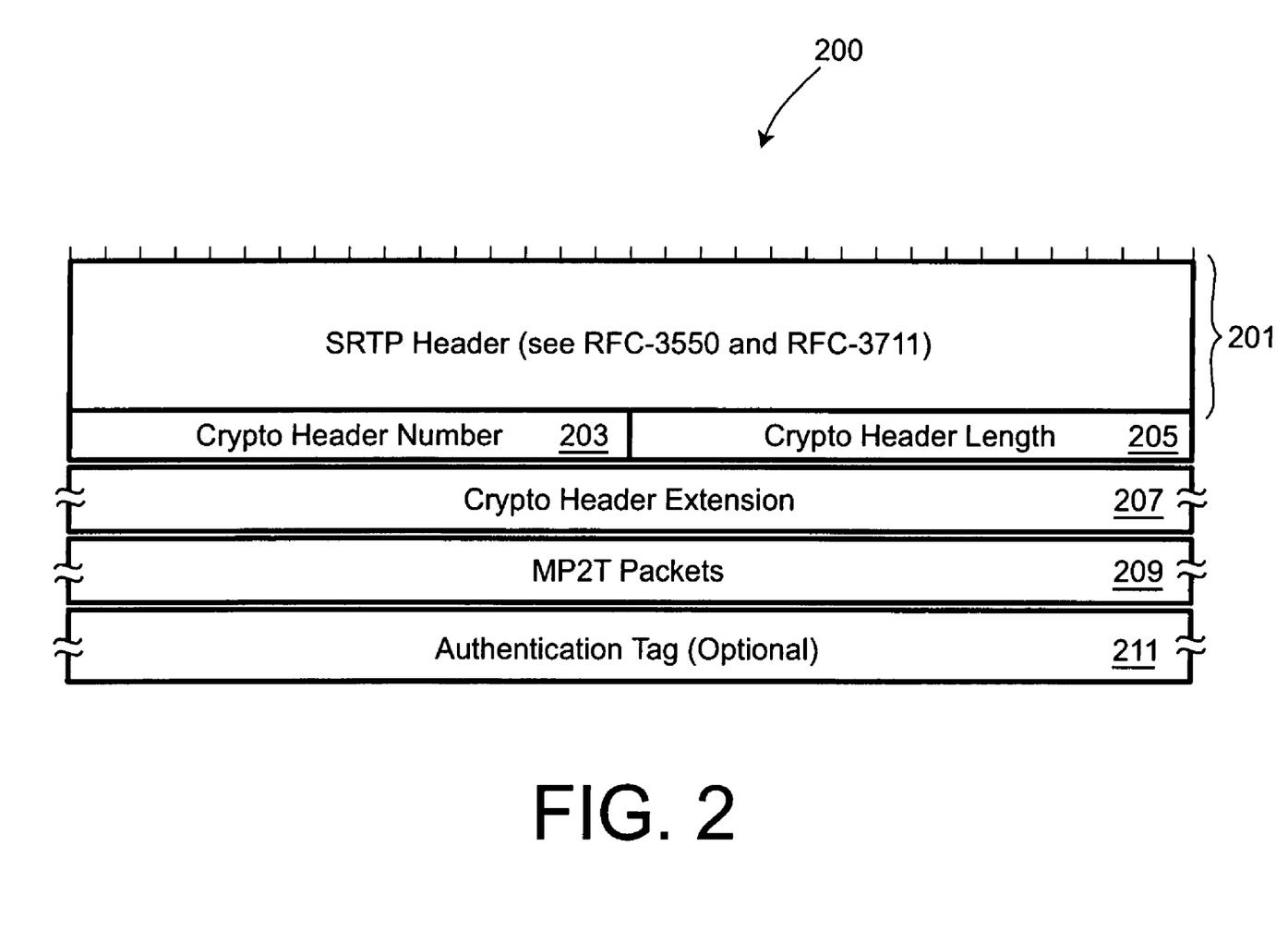
FIG. 2 shows a packet-level description of a multimedia transport packet used in one embodiment of the present invention.

FIG. 2 shows a representation of an SRTP-like packet structure of one multimedia transport packet 200 used in several embodiments of the present invention. The representation is shown is in the form of rows, each 32 bits long. In one embodiment, the packet 200 is similar to the SRTP packet as defined in (IETF) RFC-3711, for example, sharing many of the same features as an SRTP packet. In this case, the packet 200 includes a 12-octet (96-bit) header block 201 that is similar to the first twelve octets of the RTP/SRTP header, and so is only briefly (and partially) described herein. The header block 201 includes a version information field identifying the version number of the RTP/SRTP packet, and a payload type field identifying the type of payload for use by higher-level applications. The header block 201 also includes a sequence number field for the providing a sequence number of the packet, e.g., for use by a receiver for detecting packet loss and/or to restore the order of the packets. The header block 201 further includes a timestamp field that is used for synchronization and jitter control. For further details, please consult RFC-3550 for the structure of an RTP packet and RFC-3711 for the structure of an SRTP packet.

In addition to the standard SRTP header block field 201 of the packet 200, one embodiment provides a 16-bit field 203 called the Crypto Header Number field used to indicate by a number the section/each payload block, e.g., each TV program that is associated with the cryptographic information. In one embodiment, the Crypto Header Number field 203 is followed by another 16-bit field 205 called the Crypto Header Length field. The Crypto Header Length field 205 is used to indicate the total length (in octets) of a variable-length field called the Crypto Header Extension field 207 that follows the Crypto Header Length field 205. The Crypto Header Extension field 207 is used for providing CA information, e.g., codewords, keys, initialization vectors (IVs), etc., and is described in more detail hereinbelow. An initialization vector is used as a seed for encryption, e.g., DES-CBC encryption, to be used to during decryption, e.g., to synchronize initial cryptographic states for decryption. In one embodiment, the existence of the Crypto Header Extension field 207 is communicated via an out-of-band signaling protocol, e.g., by the Real Time Streaming Protocol (RTSP), by the Session Announcement Protocol (SAP), or by the Session Description Protocol (SDP). For more details on RTSP, SAP, and SDP, see (IETF) RFC-2326, RFC-2974, and RFC 2327, respectively.

In one embodiment, the packet 200 further includes a variable-length field 209 following the Crypto Header Extension field 207 that includes one or more MP2T packets and is described in more detail hereinbelow. In one embodiment, one or more MP2T packets of field 209 may include one or more encrypted multimedia segments. In another embodiment, one or more parts of one or more MP2T packets of field 209 are encrypted, each encrypted part representing an encrypted multimedia segment. Each encrypted multimedia segment is not necessarily encrypted using the same encryption method. The Crypto Header Extension field 207 is used to provide CA information, e.g., cryptographic keys, to be used by receivers to process, e.g., decrypt and/or playback, the MP2T streams corresponding to the associated MP2T packets of field 209.

In one embodiment, the packet 200 further includes a field 211 following the one or more MP2T packets 209 called the Authentication Tag field 211. Field 211 is used, for example, in the case that packet authentication is needed for connectionless integrity, e.g., using multicast communication and data origin authentication. For such authentication, field 211 includes a computer digital hash of some part of packet 200. In one embodiment, a digital hash for inclusion in the Authentication Tag field 211 is computed using fields 201, 203, 205, 207 and 209. In one embodiment, the length of the Authentication Tag field 211 is communicated out-of-band, e.g., by the Internet Key Exchange (IKE) protocol or by the Group Domain of Interpretation (GDOI) protocol. See, for example, (IETF) RFC-2401, RFC-2402, RFC-2406 and RFC-2409. In one embodiment, the absence of field 211 indicates that SRTP-level packet authentication is not used.

FIG. 3A shows a representation of the structure of a Crypto Header Extension field 207 of FIG. 2 according to an embodiment of the invention. In one embodiment, a Crypto Header Extension field 207 includes zero, one or more sections, where each section may include conditional access (CA) information associated with one or more MP2T packets of field 209. There may be zero sections in field 207, e.g., Crypto Header Length 205 is set to 0x0000 and field 207 is non-existent, in the case that no additional CA information is needed to be transported along with the one or more MP2T packets of field 209. In one embodiment, each MP2T packet of field 209 has an associated section containing CA information in field 207.

Figure 3B:
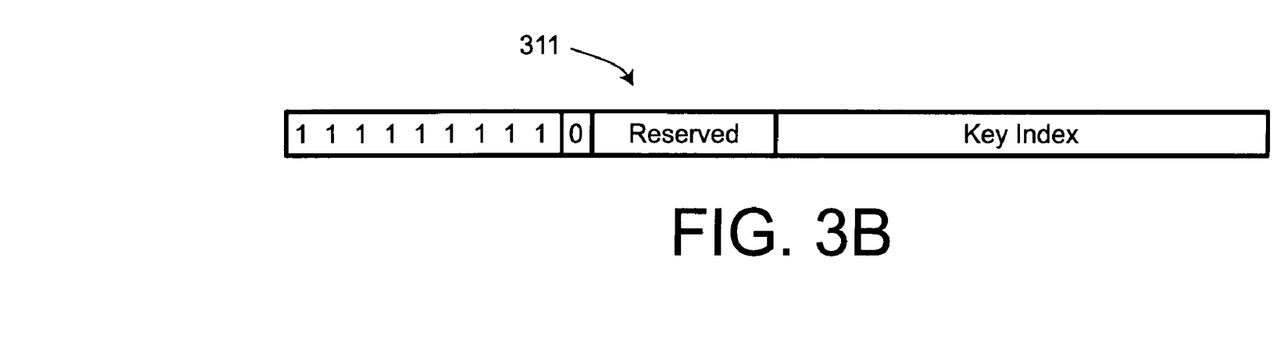
FIG. 3B shows a special type of extension field according to FIG. 3A used in one embodiment of the present invention.

In one embodiment, a section 321 of an Extension Field 207 includes a 9-bit field 301 called the Packet Index field. A Packet Index field 301 of a section 321 is used to associate a particular section 321 with an associated MP2T packet of field 209. This is useful, for example, in those cases where a particular MP2T packet requires no associated section, e.g., the particular MP2T packet has no additional CA information. In a particular embodiment, 0x01 in field 301 indicates that a section 321 refers to a first MP2T packet of field 209, 0x02 in field 301 indicates that a section 321 refers to a second MP2T packet of field 209, etc. In one embodiment, a special index value for field 301—all 9-bits set to 1 in a particular embodiment—is used to indicate that there exists an Authentication Tag field 211 of a packet 200. A special section 311 represented in FIG. 3B shows such a section for inclusion in the Crypto Header Extension field 207. The special section 311 includes a special index value used to indicate the existence of an Authentication Tag field 211 of a packet 200 according to an embodiment of the present invention. In one embodiment, an Extension Field 207 not containing a section that includes a special index value, e.g., a section conforming to special section 311, implies the absence of an Authentication Tag 211 in a packet 200.

Referring still to FIG. 3A, one embodiment provides for a 1-bit field 303 called the I field following the Packet Index field 301. An I field 303 included in a section 321 is used to indicate whether or not an 8-octet Initialization Vector (IV) field 309 is present. In one embodiment, an I field 303 set to 0x1 indicates that the IV field 309 exists, and an I field 303 set to 0x0 indicates that the IV field 309 does not exist. For example, the special section 311 shown in FIG. 3B has I set to 0x0 indicating that there is no IV field.

In one embodiment, a section 321 includes a 6-bit field 305 called the Reserved field following the I field 303. The Reserved field 305 includes reserved bits to be used in future versions of structure of packet 200. In one embodiment, section 321 further includes a 16-bit field 307 called the Key Index field following the Reserved Field 305. The Key Index field 307 is used to indicate to a receiver which key, e.g., codeword, should be used to decrypt any encrypted multimedia segments included in the associated MP2T packet of field 209. This is often necessary because CA systems usually specify a plurality of keys, e.g., codewords, for use in scrambling or encrypting a multimedia service or program. In one embodiment, the section 321 further includes an optional 8-octet field 309 the Initialization Vector (IV) field following the Key Index field 307 called. Field 309 includes an initialization vector that is used as a seeding parameter for setting up initial cryptographic states used during encryption and decryption. In one embodiment, the optional IV field is an optional Entitlement Control Message (ECM) field. For example, an optional ECM field would include an ECM as opposed to an IV so that an associated MP2T packet in field 209 of packet 200 can be compatible with DVB Simulcrypt systems.

Figure 4:
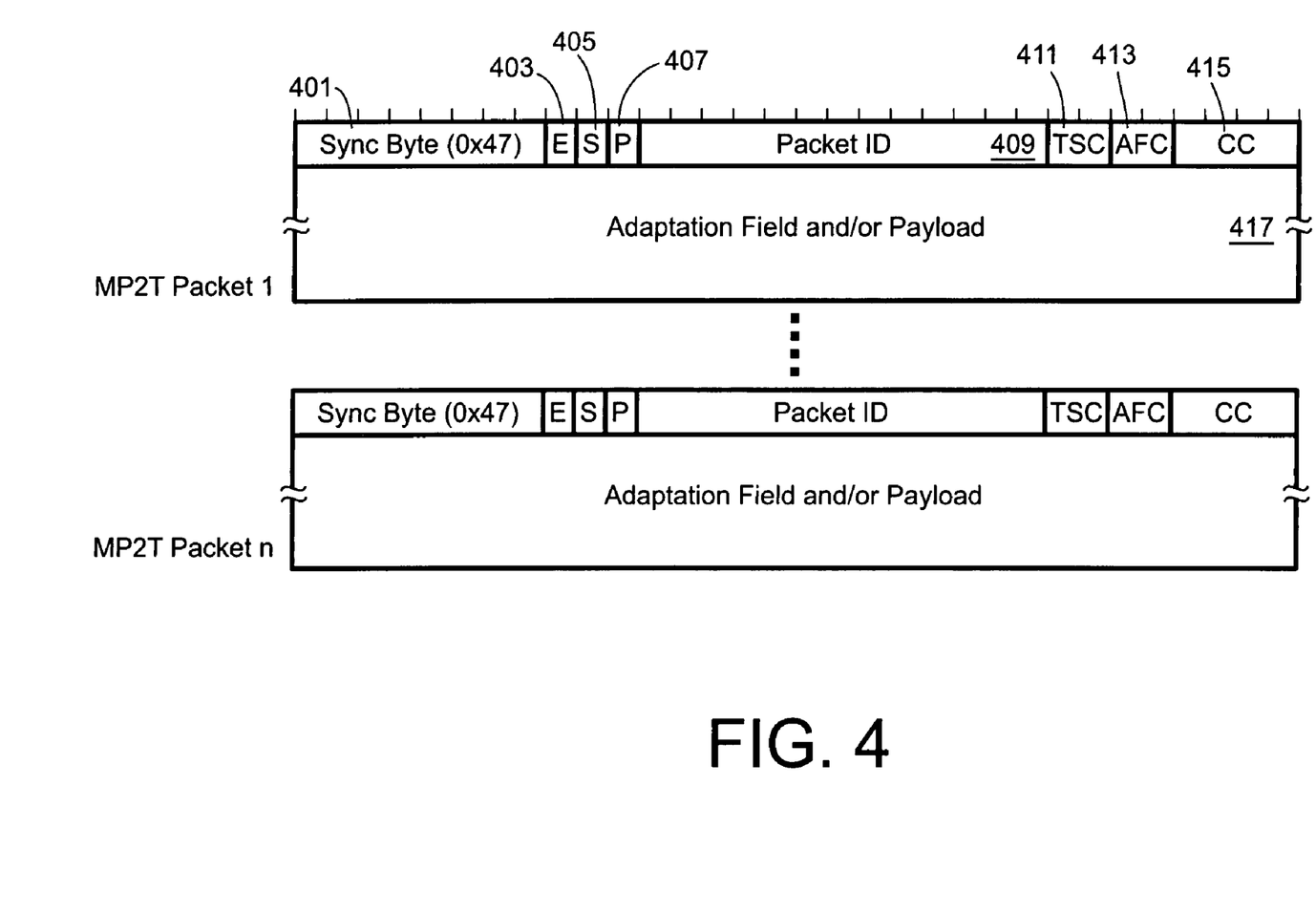
FIG. 4 shows a packet-level description of an MP2T field used in one embodiment of the present invention.

FIG. 4 shows packet-level description of field 209 of FIG. 2 used in several embodiments of the present invention. A packet 200 includes one more MP2T packets in field 209. In one embodiment, the one or more MP2T packets of field 209 may include one or more encrypted multimedia segments. In another embodiment, one or more parts of one or more MP2T packets of field 209 are encrypted, each encrypted part representing an encrypted multimedia segment. Each encrypted multimedia segment is not necessarily encrypted using the same encryption method. Similarly to FIGS. 2, 3A and 3B, each row corresponds to 32-bits. The MP2T packets described in this disclosure are assumed to be compatible with the MPEG-2 MP2T streaming packets as described in ISO/IEC 13818-1 entitled "Systems."

In one embodiment, an MP2T packet includes an 8-bit field 401 called the Sync Byte field 401. The Sync Byte field 401 is a fixed pattern-0x47 in one particular embodiment-used for MP2T packet synchronization and recovery as required by the MPEG-2 MP2T specification.

In one embodiment, an MP2T packet further includes a one-bit field called the Transport Error Indicator field 403 following the Sync Byte field 401. A Transport Error Indicator field 403 is used to indicate that the bit error rate of the MP2T packet is too high to be correctable in a decoding unit, e.g., the MP2T packet contains too many unrecoverable errors for acceptable playback. In a particular embodiment, 0x1 for field 403 indicates that the bit error rate is too high, where as 0x0 indicates that the bit error rate is acceptable.

In one embodiment, an MP2T packet further includes a one-bit field called the Payload Unit Start Indicator field 405 following the Transport Error Indicator field 403. A Payload Unit Start Indicator field 405 is used to indicate the type of data stored in an Adaptation/Payload field 417. An Adaptation/Payload field 417 is used to convey, among other things, "payload" information, e.g., a packet of an elementary stream. Field 417 is described in more detail hereinbelow. In one embodiment, field 405 designates whether the Adaptation/Payload field 417 contains a Packetized Elementary Stream (PES) packet and/or Program Specific Information (PSI) data. PES packets and PSI data are described in more detail in the MPEG-2 specification. In a particular embodiment, field 417 set to 0x1 indicates the presence of a PES packet and/or PSI data in an Adaptation/Payload field 417, and field 417 set to 0x0 indicates that an Adaptation/Payload field 417 does not contain any PES packets or PSI data.

In one embodiment, an MP2T packet further includes a one-bit field called the Transport Priority field 407 following the Payload Unit Start Indicator field 405. The Transport Priority field 407 is used to indicate whether the MP2T packet has a higher priority compared to other MP2T packets with the same Packet ID (PID). A PID is used to describe the type of payload data possibly included in the Adaptation/Payload field 417, and is described in more detail hereinbelow. In a particular embodiment, a Transport Priority field 417 set to 0x1 indicates that the MP2T packet has a higher priority than other MP2T packets with the same PID. A Transport Priority field 417 set to 0x0 indicates that the MP2T packet has same priority compared to other MP2T packets with the same PID.

In one embodiment, the MP2T packet includes a 13-bit field 409 called the Packet ID (PID) field following the Transport Priority field 407. The PID field 409 is used to indicate the type of data in the MP2T payload of an Adaptation/Payload field 417. In a particular embodiment, a PID field 409 set to 0x0000 indicates that an MP2T payload included in field 417 is a Program Association Table (PAT) packet, 0x0001 indicates that an MP2T payload included in field 417 is a Conditional Access Table (CAT) packet, and 0x1FFF indicates that an MP2T payload in field 417 is a null packet.

In one embodiment, the MP2T packet further includes a 2-bit field 411 following the PID field 409 called the Transport Scrambling Control (TSC) field. The TSC field 411 is used to indicate whether or not an Adaptation/Payload field 417 includes encrypted multimedia segments, e.g., parts of the an Adaptation/Payload field 417 are encrypted. In one embodiment, if at least one part of the Adaptation/Payload field 417 is encrypted, the TSC field 411 further indicates whether an even encryption key was used, or an odd encryption key was used. Such even/odd encryption key pairs are used, for example, in CBC methods of encryption. In a particular embodiment, a TSC field set to 0x0 implies that no parts of field 417 were encrypted, 0x2 implies that at least one part of field 417 was encrypted and that an even encryption key was used, and 0x3 implies that at least one part of field 417 was encrypted and that an odd encryption key was used. For example, when a MP2T stream is to be encrypted, the TSC field 411 of sequential MP2T packets should toggle between 0x2 and 0x3 to indicate the change of the even/odd encryption keys. In a particular embodiment, the value 0x1 for the TSC field 411 is reserved.

In one embodiment, the MP2T packet further includes a 2-bit field 413 called the Adaptation Field Control field following the TSC field 411. The Adaptation Field Control field 413 is used to indicate whether an Adaptation/Payload field 417 includes an MP2T adaptation field and/or an MP2T payload field. An MP2T adaptation field includes information, such as timing information, for associated MP2T streams. An MP2T payload field includes raw packetized data, e.g., raw video elementary stream packet(s) and/or a raw audio elementary stream packet(s). In one embodiment, field 413 set to 0x0 is reserved, field 413 set to 0x1 indicates that field 417 contains an MP2T payload field only, field 413 set to 0x2 indicates that field 417 contains an MP2T adaptation field only, and field 413 set to 0x3 indicates that the field 417 contains both an MP2T adaptation field followed by an MP2T payload field.

In one embodiment, the MP2T packet further includes a 4-bit field following the Adaptation Field Control field 413 called the Continuity Counter (CC) field 415. The CC field 415 is an incrementing counter that increments by one, in sequence, with each subsequent MP2T packet of the same PID. In a particular embodiment, the CC field includes 0x0000 to represent the first MP2T packet of a particular PID.

In one embodiment, the MP2T packet further includes a 184-octet field 417 called the Adaptation/Payload field. As indicated by the Adaptation Field Control field 413, the Adaptation/Payload field 417 can include an MP2T adaptation field, an MP2T payload field, both fields, or neither fields.

Depending on the type of data indicated by the PID field 409, the MP2T payload of an Adaptation/Payload field 417, if it exists, can belong to different classes, e.g., types, of data. In one embodiment, an Adaptation/Payload field 417 may include one or more encrypted multimedia segments. In another embodiment, one or more parts of an Adaptation/Payload field 417 are encrypted, each part representing an encrypted multimedia segment. Each encrypted multimedia segment is not necessarily encrypted using the same encryption method. In one embodiment, regardless of whether encryption is used on parts of field 417, the adaptation field portion of field 417 is never to be encrypted. Such an embodiment is used when it becomes necessary to include a Program Clock Reference (PCR) in the adaptation field of field 417 for a particular MP2T packet. For example, adjusting the PCR value is performed when an intermediary device, e.g., an MPEG-2 multiplexer, needs to compensate for network-induced jitter during the transport of a packet 200.

EXAMPLE

Figure 5:
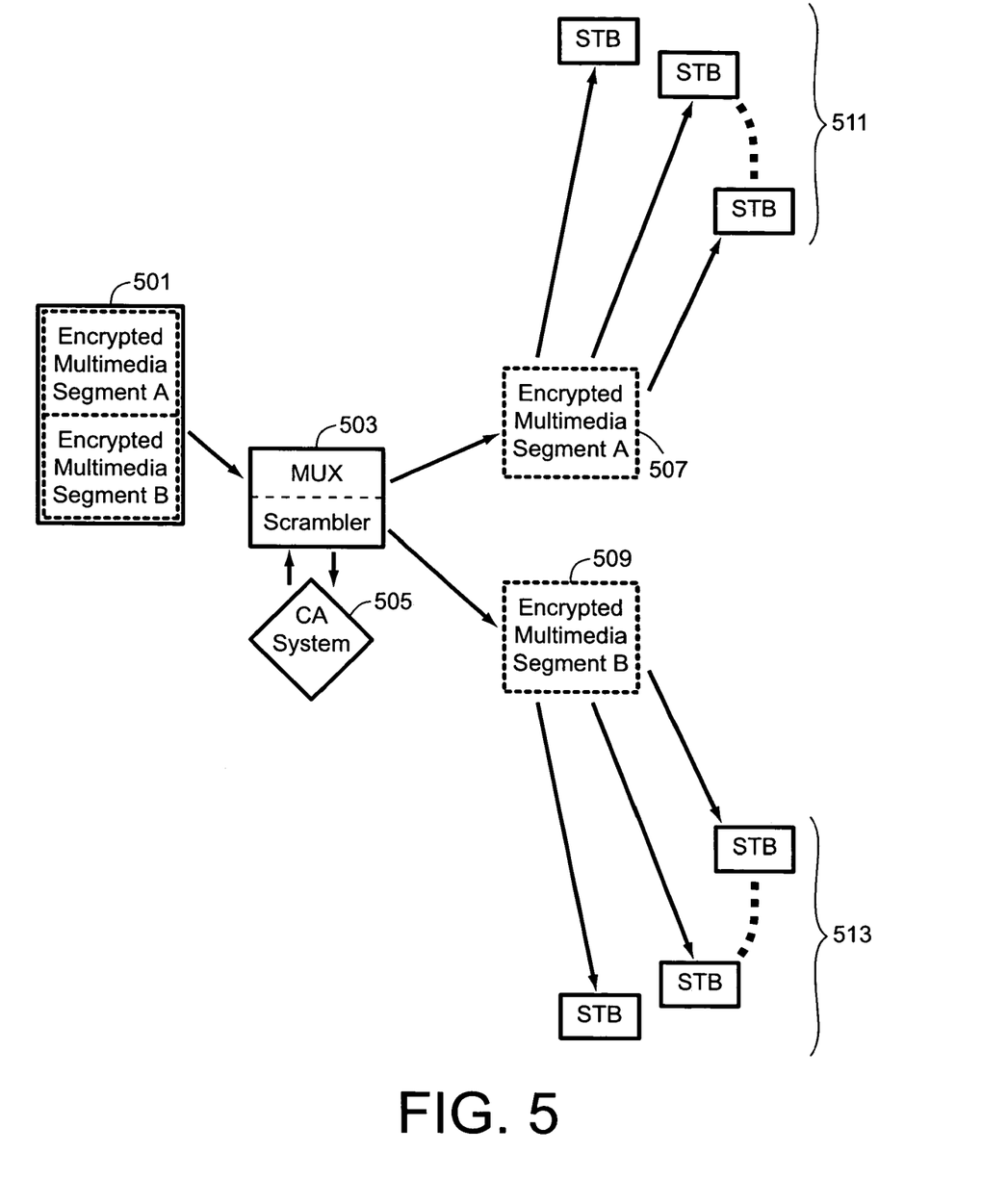
FIG. 5 shows a simplified diagram of a broadcast centric multimedia transport network with a CA system using the improvements from one embodiment of the present invention.

FIG. 5 shows a simplified diagram of an example broadcast-centric multimedia transport network including a CA system using aspects of the present invention. A packet 501 containing an encrypted multimedia segment A and an encrypted multimedia segment B is created at a content provider. When the packet 501 is received by an intermediary 503, the intermediary is able to separate the two segments A and B without having to decrypt, re-encrypt or re-scramble the contents and thus requiring the use of the connected CA system 505. The CA information necessary to transport each segment to their final destinations was included in the creation of packet 501. Each segment is then sent to two different sets of set-top boxes. In particular, segment A 507, along with any associated CA information, is sent to set-top box set A 511 whereas segment B 509, along with any associated CA information, is sent to set-top box B 513.

Aspects and embodiments of the present invention, such as those shown in FIG. 5, hold several advantages over the existing art. Some embodiments provide compatibility between packet networks, e.g., IP networks, and existing CA systems, e.g., DVB Simulcrypt. In other embodiments, arbitrary, not necessarily standard encryption methods are used to encrypt one or more multimedia streams that are transported using one or more packet networks and one or more digital broadcast transport networks. In other embodiments, packets are generated such that they are SRTP-compatible and can be properly routed and distributed using SRTP-capable routers, switches and devices.

Variations

It is well known in the art that there are many methods for encrypting data, e.g., digitally ciphering or digitally scrambling data. Block stream encryption, and in particular the cipher block chaining method, are well known in the art. This disclosure does not attempt to fully enumerate all the possible methods, schemes, designs, and protocols that can be used to encrypt and decrypt data. Some embodiments are designed to be modular in that they can support new methods of encryption, as they become available. Therefore, it should be understood that there is no implicit limitation to methods of encryption provided by this disclosure.

Those in the art will appreciate that there are many variations of the simplified transport networks shown in FIG. 1 and FIG. 5. The applicant has not attempted to describe all the possible variations and, as such, it should be appreciated that there exists many arrangements of content providers, intermediaries and consumer set-top boxes. It should also be appreciated that other devices for multimedia/video transport can be included into such models. Set-top boxes, in particular, can be standalone devices, integrated units incorporated into video or audio units such as television sets, or incorporated into adapter cards for use in personal computers. Furthermore, no attempt has been made to enumerate all the possible transport mechanisms between such devices. Such mechanisms include but are not limited to satellite links, digital subscriber loop access links, optical network links, coaxial cable networks, ATM networks, IP-based networks, satellite networks, wireless networks, and terrestrial broadcast networks. It should be appreciated that many embodiments of the present invention are modular in that they can support a plethora of devices and mechanisms, both existing and not-yet-existing. Therefore, no limitations are implied in this disclosure when making reference to transport networks or arrangements that include headends, intermediaries and/or set-top boxes.

By a multimedia service, event or program it is meant some information that represents a value to the consumer. Such information typically, but not exclusively, relates to providing some sensory information. For example, multimedia services can include analog video programs, digitally compressed video programs such as MPEG-2 programs, analog and digital audio programs, subtitled text, teletype information, or even generic network traffic such as Internet packets. Such information may be compressed or not compressed, and may be encoded into a number of different formats. No attempt has been made to completely enumerate all the possibilities for multimedia services and it should be appreciated that embodiments of the invention do not attempt to limit the nature or type of information being manipulated by the embodiments exemplified in this disclosure.

It should further be appreciated that although the invention has been described in the context of MPEG-2, in particular MP2T packets, the invention is not limited to such contexts and may be utilized in various other applications and systems, for example in a system that uses MPEG1, MPEG4, or other compressed media streams. Furthermore, the invention is not limited to any one type of network architecture and method of encapsulation, and thus may be utilized in conjunction with one or a combination of other network architectures/protocols.

One embodiment of each of the methods described herein is in the form of a computer program that executes on a processing system, e.g., one or more processors that are part of wireless station of a wireless network. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM. Further, one embodiment of the invention uses an apparatus that incorporates methods described in this disclosure.

It will be understood that the steps of methods discussed are performed in one embodiment by an appropriate processor (or processors) of a processing (e.g., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of operating a packet communication device, the method comprising:

forming a packet including a plurality of multimedia transport packets in which a plurality of multimedia stream segments may be encrypted, the packet substantially conforming to a Secure Real Time Protocol ("Secure RTP", "SRTP") packet structure as specified in RFC-3550 and RFC-3711 such that the packet can be interpreted as an SRTP packet by an SRTP compatible device, the packet including an RTP header that is unencrypted, and an RTP payload portion, the RTP payload portion including the multimedia transport packets, each multimedia transport packets including a media transport packet header and a media payload portion; and sending the packet to an intermediary, wherein in the case the media payload portion of a media transport packet is encrypted, the media transport packet header is unencrypted, such that at least some of the RTP payload portion is not encrypted, wherein the packet can include two different media transport packets with respective media payload portions that are encrypted differently, and wherein the packet includes an additional field that is not part of the SRTP standard specified in RFC-3550 and RFC-3711, the additional field providing conditional access information associated with each encrypted multimedia stream segment included in the packet, and such that the intermediary receiving the packet can send the multimedia transport packet or packets for a first segment of the plurality and any associated conditional access information to a first receiver, and send the multimedia transport packet or packets for a second segment of the plurality and any associated conditional access information to a second receiver without needing to decrypt any encrypted media payload portions of the first or second segments in the case the first stream segment or the second stream segment is encrypted.

2. A method as recited in claim 1, wherein at least one segment of the plurality is part of a video program substantially conforming to MPEG-2.

3. A method as recited in claim 1, wherein the sending is via an IP network.

4. A method as recited in claim 1, wherein the media transport packet substantially conforms to an MPEG-2 transport stream (MP2T) packet, and wherein in the case an MP2T packet included in the packet includes an adaptation field, the adaptation field is unencrypted in the packet.

5. A method as recited in claim 3, wherein the sending includes multicasting the packet over a packet network to a group of hosts, the group including a host associated with the intermediary.

6. A method as recited in claim 5, wherein the sending is via an IP network.

7. A method as recited in claim 1, wherein the intermediary is a headend of a digital broadcast transport network.

8. A method as recited in claim 7, wherein at least one segment of the plurality is part of a video program substantially conforming to MPEG-2.

9. A method as recited in claim 1, wherein the conditional access information substantially conforms to a standard used with DVB Simulcrypt.

10. A method of operating a packet communication device, the method comprising:

receiving a packet including a plurality of multimedia transport packets in which a plurality of multimedia stream segments may be encrypted, the packet substantially conforming to a Secure Real Time Protocol ("Secure RTP", "SRTP") packet structure as specified in RFC-3550 and RFC-3711 such that the packet can be interpreted as an SRTP packet by an SRTP compatible device, the packet including an RTP header that is unencrypted, and an RTP payload portion, the RTP payload portion including the multimedia transport packets, each multimedia transport packets including a media transport packet header and a media payload portion, the packet further including an additional field that is not part of the SRTP standard specified in RFC-3550 and RFC-371, the additional field providing for each segment of the plurality that is encrypted, conditional access information associated with the segment, wherein at least two distinct encrypted stream segments in the packet are encrypted by different encryption methods, and wherein, in the case the media payload portion of a media transport packet is encrypted, the media transport packet header is unencrypted, such that at least some of the RTP payload portion is not encrypted; and sending the multimedia transport packet or packets for a first stream segment of the plurality and any conditional access information associated with the first stream segment to a first receiver, and sending the multimedia transport packet or packets for a second stream segment of the plurality and any conditional access associated with the second stream segment information to a second receiver without needing to decrypt any encrypted media payload portions of the first or second segments in the case the first stream segment or the second stream segment is encrypted.

11. A method as recited in claim 10, wherein at least one segment of the plurality is part of a video program substantially conforming to MPEG-2.

12. A method as recited in claim 10, wherein the receiving is via an IP network.

13. A method as recited in claim 10, wherein the media transport packet substantially conforms to an MPEG-2 transport stream (MP2T) packet, and wherein in the case an MP2T packet included in the packet includes an adaptation field, the adaptation field is unencrypted in the packet.

14. A method as recited in claim 10, wherein the packet communication device is in a headend of a digital broadcast transport network such that the method is implemented in the headend of.

15. A method as recited in claim 10, wherein the sending is over a digital broadcast transport network.

16. A method as recited in claim 14, wherein at least one segment of the plurality is part of a video program substantially conforming to MPEG-2.

17. A method as recited in claim 10, wherein the conditional access information substantially conforms to a standard used with DVB Simulcrypt.

18. A method as recited in claim 10, wherein the first receiver and the second receiver are set-top boxes.

19. A computer-readable medium including one or more computer readable code segments that when executed by one or more processors of a processing system cause carrying out a method, the method comprising:

forming a packet including a plurality of multimedia transport packets in which a plurality of multimedia stream segments may be encrypted, the packet substantially conforming to a Secure Real Time Protocol ("Secure RTP", "SRTP") packet structure as specified in RFC-3550 and RFC-3711 such that the packet can be interpreted as an SRTP packet by an SRTP compatible device, the packet including an RTP header that is unencrypted, and an RTP payload portion, the RTP payload portion including the multimedia transport packets, each multimedia transport packets including a media transport packet header and a media payload portion; and sending the packet to an intermediary, wherein in the case the media payload portion of a media transport packet is encrypted, the media transport packet header is unencrypted, such that at least some of the RTP payload portion is not encrypted, wherein the packet can include two different media transport packets with respective media payload portions that are encrypted differently, and wherein the packet includes an additional field that is not part of the SRTP standard specified in RFC-3550 and RFC-3711, the additional field providing conditional access information associated with each encrypted multimedia stream segment included in the packet, such that the intermediary receiving the packet can send the multimedia transport packet or packets for a first segment of the plurality and any associated conditional access information to a first receiver, and send the multimedia transport packet or packets for a second segment of the plurality and any associated conditional access information to a second receiver without needing to decrypt any encrypted media payload portions of the first or second segments in the case the first stream segment or the second stream segment is encrypted.

20. A computer-readable medium including one or more computer readable code segments that when executed by one or more processors of a processing system cause carrying out a method, the method comprising:

receiving a packet including a plurality of multimedia transport packets in which a plurality of multimedia stream segments may be encrypted, the packet substantially conforming to a Secure Real Time Protocol ("Secure RTP", "SRTP") packet structure as specified in RFC-3550 and RFC-3711 such that the packet can be interpreted as an SRTP packet by an SRTP compatible device, the packet including an RTP header that is unencrypted, and an RTP payload portion, the RTP payload portion including the multimedia transport packets, each multimedia transport packets including a media transport packet header and a media payload portion, the packet further including an additional field that is not part of the SRTP standard specified in RFC-3550 and RFC-371, the additional field providing for each segment of the plurality that is encrypted, conditional access information associated with the segment, wherein at least two distinct encrypted stream segments in the packet are encrypted by different encryption methods, and wherein, in the case the media payload portion of a media transport packet is encrypted, the media transport packet header is unencrypted, such that at least some of the RTP payload portion is not encrypted; and sending the multimedia transport packet or packets for a first stream segment of the plurality and any associated conditional access information associated with the first stream segment to a first receiver, and sending the multimedia transport packet or packets for a second stream segment of the plurality and any conditional access information associated with the second stream segment to a second receiver without needing to decrypt any encrypted media payload portions of the first or second segments in the case the first stream segment or the second stream segment is encrypted.

21. An apparatus comprising:

means for forming a packet including a plurality of multimedia transport packets in which a plurality of multimedia stream segments may be encrypted, the packet substantially conforming to a Secure Real Time Protocol (SRTP) like ("Secure RTP", "SRTP") packet structure as specified in RFC-3550 and RFC-3711 such that the packet can be interpreted as an SRTP packet by an SRTP compatible device, the packet including an RTP header that is unencrypted, and an RTP payload portion, the RTP payload portion including the multimedia transport packets, each multimedia transport packets including a media transport packet header and a media payload portion; and means for sending the packet to an intermediary, wherein in the case the media payload portion of a media transport packet is encrypted, the media transport packet header is unencrypted, such that at least some of the RTP payload portion is not encrypted, wherein the packet can include two different media transport packets with respective media payload portions that are encrypted differently, and wherein the packet includes an additional field that is not part of the SRTP standard specified in RFC-3550 and RFC-3711, the additional field providing conditional access information associated with each encrypted multimedia stream segment included in the packet, such that the intermediary receiving the packet can send the multimedia transport packet or packets for a first segment of the plurality and any associated conditional access information to a first receiver, and send the multimedia transport packet or packets for a second segment of the plurality and any associated conditional access information to a second receiver without needing to decrypt any encrypted media payload portions of the first or second segments in the case the first stream segment or the second stream segment is encrypted.

22. An apparatus comprising:

means for receiving a packet including a plurality of multimedia transport packets in which a plurality of multimedia stream segments may be encrypted, the packet substantially conforming to a Secure Real Time Protocol ("Secure RTP", "SRTP") packet structure as specified in RFC-3550 and RFC-3711 such that the packet can be interpreted as an SRTP packet by an SRTP compatible device, the packet including an RTP header that is unencrypted, and an RTP payload portion, the RTP payload portion including the multimedia transport packets, each multimedia transport packets including a media transport packet header and a media payload portion, the packet further including an additional field that is not part of the SRTP standard specified in RFC-3550 and RFC-371, the additional field providing for each segment of the plurality that is encrypted, conditional access information associated with the segment, wherein at least two distinct encrypted stream segments in the packet are encrypted by different encryption methods, and wherein, in the case the media payload portion of a media transport packet is encrypted, the media transport packet header is unencrypted and the RTP header is unencrypted, such that at least some of the RTP payload portion is not encrypted; and means for sending the multimedia transport packet or packets for a first stream segment of the plurality and any conditional access information associated with the first stream segment to a first receiver, and sending the multimedia transport packet or packets for a second stream segment of the plurality and any conditional access information associated with the second stream segment to a second receiver without needing to decrypt any encrypted media payload portions of the first or second segments in the case the first stream segment or the second stream segment is encrypted.

* * * * *

UNITED STATES PATENT AND TRADEMARK OFFICE
CERTIFICATE OF CORRECTION

| | | |
|---|---|---|
| PATENT NO. | : 7,746,853 B2 | Page 1 of 1 |
| APPLICATION NO. | : 10/918910 | |
| DATED | : June 29, 2010 | |
| INVENTOR(S) | : Zhang | |

It is certified that error appears in the above-identified patent and that said Letters Patent is hereby corrected as shown below:

In Column 16, line 42, after "any" kindly delete the word "associated".

Signed and Sealed this

Twelfth Day of October, 2010

David J. Kappos
*Director of the United States Patent and Trademark Office*